US011051333B2

(12) United States Patent
Tang et al.

(10) Patent No.: US 11,051,333 B2
(45) Date of Patent: Jun. 29, 2021

(54) DATA TRANSMISSION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Hai Tang, Guangdong (CN); Ning Yang, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 13 days.

(21) Appl. No.: 16/618,939

(22) PCT Filed: Aug. 28, 2017

(86) PCT No.: PCT/CN2017/099343
§ 371 (c)(1),
(2) Date: Dec. 3, 2019

(87) PCT Pub. No.: WO2019/041099
PCT Pub. Date: Mar. 7, 2019

(65) Prior Publication Data
US 2020/0146053 A1 May 7, 2020

(51) Int. Cl.
*H04W 74/00* (2009.01)
*H04W 76/30* (2018.01)
(Continued)

(52) U.S. Cl.
CPC ....... *H04W 74/006* (2013.01); *H04W 68/005* (2013.01); *H04W 74/0833* (2013.01); *H04W 76/30* (2018.02)

(58) Field of Classification Search
CPC . H04W 74/006; H04W 76/30; H04W 68/005; H04W 74/0833; H04W 76/34;
(Continued)

(56) References Cited

U.S. PATENT DOCUMENTS

2010/0238831 A1* 9/2010 Jeong ................. H04W 52/267
370/252
2015/0359002 A1 12/2015 Uchino et al.

FOREIGN PATENT DOCUMENTS

CN 102300203 12/2011
CN 106604365 4/2017
(Continued)

OTHER PUBLICATIONS

Vinel, Alexey, et al. "Capacity analysis of reservation-based random access for broadband wireless access networks." IEEE Journal on Selected Areas in Communications 27.2 (2009): 172-181. (Year: 2009).*

(Continued)

*Primary Examiner* — Sharad Rampuria
(74) *Attorney, Agent, or Firm* — Hodgson Russ LLP

(57) ABSTRACT

Provided are a data transmission method, a network device, and a terminal device. The method includes: generating configuration information, wherein the configuration information is configured to indicate a resource used by a first terminal device in an inactive state to perform random access, and the inactive state refers to a state in which the first terminal device is disconnected from a first network device and the first network device keeps context information of the first terminal device; and sending the configuration information to the first terminal device.

18 Claims, 3 Drawing Sheets

(51) Int. Cl.
*H04W 68/00* (2009.01)
*H04W 74/08* (2009.01)

(58) Field of Classification Search
CPC ..... H04W 76/27; H04W 72/04; H04W 72/12; H04W 76/00; H04B 7/2121; H04B 7/2123; H04J 2203/0069; H04Q 2213/394
See application file for complete search history.

(56) References Cited

FOREIGN PATENT DOCUMENTS

| CN | 106793170 | 5/2017 |
|----|-----------|--------|
| CN | 106992953 | 7/2017 |
| RU | 2548152 | 4/2015 |
| WO | 2012154955 | 11/2012 |

OTHER PUBLICATIONS

LG Electronics Inc., "Issue on C-RNTI allocation for RRC connection resume," 3GPP TSG-RAN WG3 Meeting #NR AdHoc, R3-172266, Jun. 2017, 3 pages.
Samsung et al., "C-RNTI allocation in mobility procedure," 3GPP TSG-RAN WG3 Meeting #97, R3-172958, Aug. 2017, 3 pages.
Samsung et al., "C-RNTI allocation in mobility procedure," 3GPP TSG-RAN WG3 Meeting Ad Hoc, R3-172248, Jun. 2017, 3 pages.
Samsung, "Random Access Procedure for RRC Inactive State," 3GPP TSG-RAN WG2 NR#2, R2-1706532 (Resubmission of R2-1704157), Jun. 2017, 3 pages.
EPO, Office Action for EP Application No. 17923589.0, dated Apr. 23, 2020.
OPPO, "Discussion on Data transmission in 'Inactive' State", 3GPP TSG-RAN WG2 Meeting #96, R2-167479, Nov. 2016, 5 pages.
OPPO, "Issues on Data transmission in Inactive state," 3GPP TSG-RAN2#97, R2-1700963, Feb. 2017, 6 pages.
WIPO, ISR for PCT/CN2017/099343, May 25, 2018.
3GPP Organizational Partners, "Medium Access Control (MAC) protocol specification (Release 10)," 3GPP TSG-RAN E-UTRA, 2010, 53 pages.
ETSI MCC, "Report of 3GPP TSG RAN2#98 meetinng, Hangzhou, China," 3GPP TSG-RAN WG2 meeting #99, R2-1707601, Aug. 21, 2017, 294 pages.
CIPO, Office Action for CA Application No. 3063618, dated Jan. 27, 2021.
FIPS, Office Action for RU Application No. 2019138522, dated Jan. 13, 2021.
IPI, Office Action for IN Application No. 201917050628, dated Mar. 16, 2021.

* cited by examiner

DATA TRANSMISSION METHOD, NETWORK DEVICE, AND TERMINAL DEVICE

CROSS-REFERENCE TO RELATED APPLICATION

This application is a U.S. national phase application of International Application No. PCT/CN2017/099343, filed Aug. 28, 2017, the entire disclosure of which is incorporated herein by reference.

TECHNICAL FIELD

Embodiments of the present disclosure generally relate to communication technologies, and more particularly, to data transmission methods, network devices and terminal devices.

BACKGROUND

Now days, people increasingly pursue high speed, low delay, high-speed mobility, and energy efficiency, and the services in the future life are diversified and complex.

The 3rd Generation Partnership Project (3GPP) International Standards Organization began to develop the fifth generation (5-Generation, 5G) of mobile communication technologies. The main application scenarios of 5G are: Enhanced Mobile Broadband (eMBB) communication, Ultra-Reliable and Low Latency Communication (URLLC), and Massive Machine Type of Communication (mMTC), and so on.

Among them, the typical application scenarios of URLLC include: industrial automation, power automation, telemedicine operation (surgery), traffic safety and so on. The URLLC service has a high latency requirement, and it is important to establish an RRC connection quickly, and then to transmit service data.

In the 5G network environments, in order to reduce air interface signaling and quickly recover wireless connections and to quickly recover data services, a new Radio Resource Control (RRC) state is defined, that is, a Radio Resource Control Inactive (RRC_INACTIVE) state.

However, in the related arts, when a terminal device in the RRC_INACTIVE state needs to restore the connection with the network side, the terminal device still uses a contention-based manner to access the network, and this cannot meet the latency requirement of the URLLC type service.

SUMMARY

A data transmission method, a network device and a terminal device are provided to effectively reduce latency.

According to a first aspect, there is provided a data transmission method, including:

generating configuration information, wherein the configuration information is configured to indicate a resource used by a first terminal device in an inactive state to perform random access, and the inactive state refers to a state in which the first terminal device is disconnected from a first network device and the first network device keeps context information of the first terminal device; and sending the configuration information to the first terminal device.

In embodiments of the present disclosure, the network side pre-configure resources for random access for the terminal device, the terminal device can quickly access the network and the latency can be reduced.

In some possible implementations, the configuration information is configured to indicate a resource pool dedicated to the random access, the resource pool is used for at least one terminal device to perform the random access, and the at least one terminal device includes the first terminal device.

In some possible implementations, an access level of each of the at least one terminal device is a specific access level, and/or a service type that each of the at least one terminal device uses for transmission is a specific service type.

In embodiments of the present disclosure, the network device pre-configure resources for random access for the terminal device having a specific access level, or the terminal device uses a specific service type to transmit data or information, so that such terminal device can quickly access the network and the latency can be reduced.

In some possible implementations, sending the configuration information to the first terminal device, includes:

sending a system message to the first terminal device, wherein the system message includes the configuration information.

In some possible implementations, the configuration information is configured to indicate a dedicated resource used by the first terminal device to perform the random access.

In some possible implementations, before generating the configuration information, the method further includes:

obtaining an access level of the first terminal device and/or a service type used by the first terminal device for transmission;

wherein generating configuration information includes:

generating the configuration information if the access level of the first terminal device is a specific access level, and/or the service type used by the first terminal device for transmission is a specific service type.

In some possible implementations, generating configuration information, includes:

if it is determined to make the first terminal device enter the inactive state, generating the configuration information.

In some possible implementations, sending the configuration information to the first terminal device, includes:

sending to the first terminal device Radio Resource Control (RRC) connection release signaling, wherein the RRC connection release signaling includes the configuration information.

In some possible implementations, sending the configuration information to the first terminal device includes:

upon receipt of downlink data for the first terminal device sent from a core network, sending Physical Downlink Control Channel (PDCCH) signaling to the first terminal device, wherein the PDCCH signaling includes the configuration information.

In some possible implementations, before sending the Physical Downlink Control Channel (PDCCH) signaling to the first terminal device, the method further includes:

determining a first Cell Radio Network Temporary Identifier (C-RNTI) by negotiating with at least one second network device in a Radio Access Network (RAN) paging area, wherein the RAN paging area is a paging area configured by the first network device for the terminal device;

wherein the PDCCH signaling is signaling scrambled by the first C-RNTI.

In some possible implementations, the at least one second network device reserves the first C-RNTI for the first terminal device, or the first network device and the at least one second network device allocates different C-RNTIs to the first terminal device.

In some possible implementations, before sending the Physical Downlink Control Channel (PDCCH) signaling to the first terminal device, the method further includes:

sending C-RNTI information to the first terminal device;

wherein if the at least one second network device reserves the first C-RNTI for the first terminal device, the C-RNTI information includes the first C-RNTI; if the first network device and the at least one second network device allocates different C-RNTIs to the first terminal device, the C-RNTI information includes the first C-RNTI, a Global Cell Identifier (CGI) corresponding to the first C-RNTI, at least one second C-RNTI, and a CGI corresponding to the at least one second C-RNTI, wherein the at least one second C-RNTI is a C-RNTI which is allocated by a network device in the RAN paging area for the first terminal device.

In some possible implementations, before sending the C-RNTI information to the first terminal device, the method further includes:

sending a reservation request to each of the at least one second network device, wherein the reservation request is configured to request each of the at least one second network device to reserve the first C-RNTI for the first terminal device; or, sending to each of the at least one second network device a negotiation request, wherein the negotiation request is configured to request each of the at least one second network device to allocate the second C-RNTI for the first terminal device; and receiving a response message from each of the at least one second network device, wherein the response message is used by the first network device to determine the C-RNTI information.

In some possible implementations, before sending the PDCCH signaling to the first terminal device, the method further includes:

sending the PDCCH signaling to the first terminal device, wherein the PDCCH signaling is signaling that is scrambled by identification information, and the identification information includes an identifier of the context information.

In some possible implementations, the method further includes:

upon receipt of the downlink data sent by the core network, sending to the at least one second network device notification information, wherein the notification information is configured to notify each of the at least one second network device that the first network device has received the downlink data.

In some possible implementations, sending the configuration information to the first terminal device includes:

sending a paging message to the first terminal device, wherein the paging message includes the configuration information.

In some possible implementations, the method further includes:

sending to the first terminal device downlink data for the first terminal device; or receiving uplink data for the first terminal device which is sent from the first terminal device.

According to a second aspect, there is provided a data transmission method, including:

receiving configuration information sent from a first network device, wherein the configuration information is configured to indicate a resource used by a first terminal device in an inactive state to perform random access, and the inactive state refers to a state in which the first terminal device is disconnected from the first network device and the first network device keeps context information of the first terminal device; and randomly accessing a network according to the configuration information.

In some possible implementations, the configuration information is configured to indicate a resource pool dedicated to the random access, the resource pool is used for at least one terminal device to perform the random access, and the at least one terminal device includes the first terminal device;

wherein randomly accessing a network according to the configuration information, includes:

according to the configuration information, randomly accessing the network in a resource contention manner.

In some possible implementations, an access level of each of the at least one terminal device is a specific access level, and/or a service type that each of the at least one terminal device uses for transmission is a specific service type.

In some possible implementations, receiving configuration information sent from a first network device, includes:

receiving a system message sent from the first network device, wherein the system message includes the configuration information.

In some possible implementations, the configuration information is configured to indicate a dedicated resource used by the first terminal device to perform the random access;

wherein randomly accessing a network according to the configuration information, includes:

according to the configuration information, randomly accessing the network using the dedicated resource.

In some possible implementations, before receiving configuration information sent from a first network device, the method further includes:

sending to the first network device an access level of the first terminal device and/or a service type used by the first terminal device for transmission.

In some possible implementations, receiving configuration information sent from a first network device, includes:

receiving Radio Resource Control (RRC) connection release signaling sent from the first network device, wherein the RRC connection release signaling includes the configuration information.

In some possible implementations, receiving configuration information sent from a first network device, includes:

receiving Physical Downlink Control Channel (PDCCH) signaling sent from the first network device, wherein the PDCCH signaling includes the configuration information.

In some possible implementations, before receiving the Physical Downlink Control Channel (PDCCH) signaling sent from the first network device, the method further includes:

receiving Cell Radio Network Temporary Identifier (C-RNTI) information sent from the first network device, wherein the C-RNTI information includes a first C-RNTI; or the C-RNTI information includes the first C-RNTI, a Global Cell Identifier (CGI) corresponding to the first C-RNTI, at least one second C-RNTI, and a CGI corresponding to the at least one second C-RNTI, wherein the first C-RNTI is a C-RNTI which is allocated by the first network device for the first terminal device, and the at least one second C-RNTI is a C-RNTI which is allocated by a network device in a Radio Access Network (RAN) paging area for the first terminal device;

wherein receiving the Physical Downlink Control Channel (PDCCH) signaling sent from the first network device, includes:

receiving the PDCCH signaling sent from the first network device according to the first C-RNTI; or receiving the PDCCH signaling sent from the first network device according to the first C-RNTI and the CGI corresponding to the first C-RNTI.

In some possible implementations, receiving the Physical Downlink Control Channel (PDCCH) signaling sent from the first network device, includes:

receiving the PDCCH signaling sent from the first network device according to identification information, wherein the identification information includes an identifier of the context information.

In some possible implementations, receiving configuration information sent from a first network device, includes:

receiving a paging message sent from the first network device, wherein the paging message includes the configuration information.

In some possible implementations, the method further includes:

sending uplink data for the first terminal device to the first network device; or receiving downlink data for the first terminal device which is sent from the first network device.

According to a third aspect, there is provided a network device, including:

a processing unit configured to generate configuration information, wherein the configuration information is configured to indicate a resource used by a first terminal device in an inactive state to perform random access, and the inactive state refers to a state in which the first terminal device is disconnected from a first network device and the first network device keeps context information of the first terminal device; and a transceiver unit configured to send the configuration information to the first terminal device.

According to a fourth aspect, there is provided a network device, including:

a processor configured to generate configuration information, wherein the configuration information is configured to indicate a resource used by a first terminal device in an inactive state to perform random access, and the inactive state refers to a state in which the first terminal device is disconnected from a first network device and the first network device keeps context information of the first terminal device; and a transceiver configured to send the configuration information to the first terminal device.

According to a fifth aspect, there is provided a terminal device, including:

a transceiver unit configured to receive configuration information sent from a first network device, wherein the configuration information is configured to indicate a resource used by a first terminal device in an inactive state to perform random access, and the inactive state refers to a state in which the first terminal device is disconnected from the first network device and the first network device keeps context information of the first terminal device; and a processing unit configured to randomly access a network according to the configuration information.

According to a sixth aspect, there is provided a terminal device, including:

a transceiver configured to receive configuration information sent from a first network device, wherein the configuration information is configured to indicate a resource used by a first terminal device in an inactive state to perform random access, and the inactive state refers to a state in which the first terminal device is disconnected from the first network device and the first network device keeps context information of the first terminal device; and a processer configured to randomly access a network according to the configuration information.

According to a seventh aspect, there is provided a computer readable medium. The computer readable medium is configured to store computer programs. The computer programs includes instructions for performing the methods according to the first aspect or the second aspect.

According to an eighth aspect, there is provided a computer chip. The computer chip includes an input interface, an output interface, at least one processor and a memory. The at least processor is configured to execute codes stored in the memory, and when the codes are executed, the processor is caused to perform processes which are performed by the network device in the data transmission methods according to the first aspect and various implementations.

According to a ninth aspect, there is provided a computer chip. The computer chip includes an input interface, an output interface, at least one processor and a memory. The at least processor is configured to execute codes stored in the memory, and when the codes are executed, the processor is caused to perform processes which are performed by the terminal device in the data transmission methods according to the second aspect and various implementations.

According to a tenth aspect, there is provided a communication system, including the previously described network device and terminal device.

DETAILED DESCRIPTION

Figure 1:
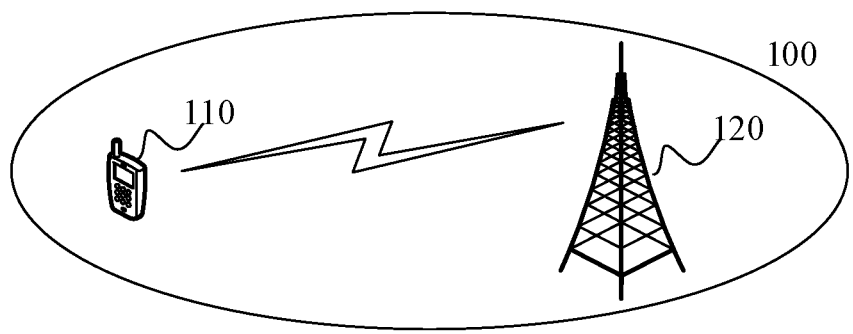
FIG. 1 is an example of a communication system according to an embodiment of the present disclosure.

FIG. 1 is a schematic diagram of a communication system in accordance with an embodiment of the present disclosure.

As shown in FIG. 1, the communication system 100 can include a terminal device 110 and a network device 120. The network device 120 can communicate with terminal device 110 over an air interface. Multi-service transmission is supported between the terminal device 110 and the network device 120. The terminal device 110 may be in an RRC_INACTIVE state.

The RRC_INACTIVE state is different from the Radio Resource Control Idle (RRC_IDLE) state and the Radio Resource Control Active (RRC_ACTIVE) state. To facilitate the understanding of the technical solutions, a brief introduction is made to the terminal device in the RRC_INACTIVE state.

Specifically, for the RRC_IDLE state, there is no RRC connection between the terminal device and the network device, and the network device does not store the context information for the terminal device. When the terminal device needs to be paged, paging is initiated by a core network, and the core network configures a paging area. The mobility is cell selection based on the terminal device or cell reselection. For the RRC_ACTIVE state, there is an RRC connection between the terminal device and the network device, and the network device and the terminal device store the context information for the terminal device. The location of the terminal device acquired by the network device is at a specific cell level. The mobility is the mobility controlled by the network device.

For the RRC_INACTIVE state, there is a connection between the core network (CN) and the network device, and the context information for the terminal device exists on a certain network device. The paging is triggered by a Radio Access Network (RAN), and the RAN paging area is managed by the RAN. That is, the location of the terminal device acquired by the network device is at the RAN paging area level. The mobility is cell selection based on the terminal device or cell reselection. In other words, the terminal device in the RRC_INACTIVE state is disconnected from the network device, and the network device retains context information for the terminal device. The context information is used to quickly establish a connection between the terminal device and the network device.

For example, when the terminal device is in the RRC_INACTIVE state, the network device configures the RAN paging area for the terminal device, and the RAN paging area may include multiple cells. That is to say, when performing cell reselection, the terminal device may be triggered to restore the RRC connection based on the RAN paging area.

When the terminal device performs cell reselection, if the terminal device moves within the paging area of the RAN, the network device is not notified. More specifically, the terminal device may follow the mobility behavior under RRC_IDLE, that is, the terminal device may follow the cell selection reselection principle under RRC_IDLE to perform cell reselection. If the terminal device moves out of the paging area of the RAN, the terminal device may be triggered to restore the RRC connection and re-acquire the paging area configured by the network device.

In other words, when there is downlink data arrival for the terminal device, the network device that maintains the connection between the RAN and the CN for the terminal device triggers all cells in the RAN paging area to send a paging message to the terminal device, so that the terminal device in the RRC_INACTIVE state can restore the RRC connection and perform data reception. When there is uplink data, the terminal device triggers a random access procedure and accesses the network for data transmission.

The low latency and high reliability services in 5G networks have high latency requirements, for example, the URLLC services. When there is such uplink data, the signaling generated by the terminal device for triggering the random access procedure may has a large latency, and this cannot meet the data transmission requirements, and reduces the user experience.

A method for transmitting data is provided in the embodiments of the present disclosure. The network device preconfigures a random access resource for a terminal device in an RRC_INACTIVE state, so that when there is downlink data or uplink data, the terminal device can quickly access the network. In this way, the access latency is shortened, the connection is quickly restored, and the user experience is effectively improved.

It should be understood that embodiments of the present disclosure are applicable to any communication system including a terminal device in an RRC_INACTIVE state. That is, the embodiments of the present disclosure are exemplified only by the communication system 100, but the embodiments of the present disclosure are not limited thereto. The technical solutions of the embodiments of the present disclosure can be applied to various communication systems, such as a Global System of Mobile communication (GSM) system, a Code Division Multiple Access (CDMA) system, and a Wideband Code Division Multiple Access (WCDMA) system, a General Packet Radio Service (GPRS) system, a Long Term Evolution (LTE) system, LTE Time Division Duplex (TDD) system, a Universal Mobile Telecommunication System (UMTS) and the like.

The present disclosure describes various embodiments in connection with network devices and terminal devices.

The network device 120 may refer to any entity on the network side that is used to send or receive signals. For example, the network device 120 may be user equipment in a machine type communication (MTC), a base station (BTS) in GSM or CDMA, a base station (NodeB) in WCDMA, an evolved base station (Evolutional Node B, eNB or eNodeB) in LTE, a base station in a 5G network, and the like.

Further, the terminal device 110 may be any terminal device. Specifically, the terminal device 110 can communicate with one or more core networks via a radio access network (RAN), and can also be referred to as an access terminal, user equipment, a subscriber unit, a subscriber station, a mobile station, a mobile terminal, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handled device with wireless communication functions, computing devices or other processing devices connected to wireless modems, in-vehicle devices, wearable devices, terminal devices in future 5G networks, and the like.

The methods for cell reselection in the embodiments of the present disclosure are described in detail below.

Figure 2:
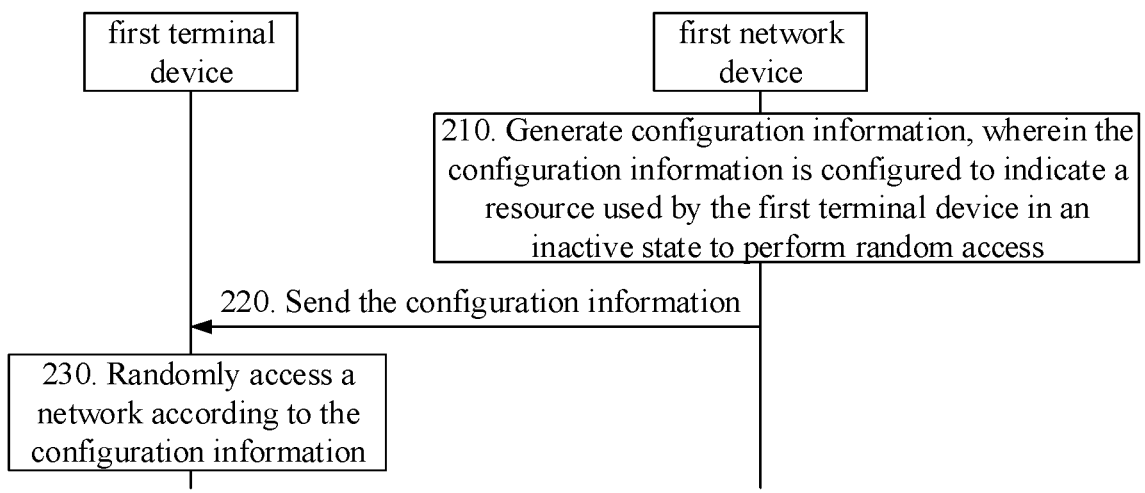
FIG. 2 is a schematic flowchart of a data transmission method according to an embodiment of the present disclosure.

FIG. 2 is a schematic flowchart of a method 200 for transmitting data according to an embodiment of the present disclosure.

As shown in FIG. 1, the method 200 includes the following steps:

In 210, a first network device generates configuration information. The configuration information includes a resource used by a first terminal device in an inactive state to perform random access.

In 220, the first network device sends the configuration information to the first terminal device.

In 230, the first terminal device randomly accesses a network according to the configuration information.

The first network device generates the configuration information. The configuration information is configured to indicate a resource used by a first terminal device in an inactive state to perform random access, and the inactive state refers to a state in which the first terminal device is disconnected from a first network device and the first network device keeps context information of the first terminal device, and the first network device sends the configuration information to the first terminal device.

In other words, after receiving the configuration information sent by the first network device, the first terminal device may use the resource as indicated by the configuration information to randomly access the network, so that the first terminal device can receive downlink data for the first terminal device, or send uplink data of the first terminal device.

It should be understood that, in the embodiments of the present disclosure, the configuration information may be configured to indicate a resource pool dedicated to the random access, or may be configured to indicate a dedicated resource used by the first terminal device to perform random access, and embodiments of the present disclosure do not impose specific limitations on this.

According to an embodiment, the configuration information is configured to indicate a resource pool dedicated to the random access, the resource pool is used for at least one terminal device to perform the random access, and the at least one terminal device includes the first terminal device.

In view of the massive terminal connection scenario in the 5G environment, in order to further reduce the collision probability, this reserved dedicated random access resource is only used for some users. For example, an access level of each of the at least one terminal device is a specific access level, and/or a service type that each of the at least one terminal device uses for transmission is a specific service type. For example, terminal devices associated with a certain operator can be determined as having a specific access level.

The terminal device whose access level is the specific access level and the terminal device which uses a specific service type to transmit data or information are only some examples. In actual implementations, depending on requirements or scenarios, the network device may pre-configure dedicated random access resources for certain terminals, for example, based on user selection, and so on.

When the configuration information is used to indicate a resource pool dedicated to random access, the at least one terminal device may use the resource pool for random access.

Therefore, the first network device can send a system message to the first terminal device, and the system message includes the configuration information. Correspondingly, the first terminal device randomly accesses the network in a resource contention manner according to the configuration information.

According to another embodiment, the configuration information may be used to indicate a dedicated resource used by the first terminal device to perform random access. Under such condition, the first terminal device can directly access the network through the dedicated resource according to the configuration information. This embodiment can further effectively reduce the latency.

Further, considering the massive terminal connection scenario in the 5G environment, the dedicated resources in the system are not enough. The dedicated random access resources may be pre-configured for some specific terminals. For example, the first network device obtains an access level of the first terminal device and/or a service type used by the first terminal device for transmission; the first network device generates the configuration information if the access level of the first terminal device is a specific access level, and/or the service type used by the first terminal device for transmission is a specific service type.

In the embodiments of the present disclosure, the purpose of the configuration information is to indicate a dedicated resource used by the first terminal device in the inactive state to perform random access. Therefore, if first network device determines to make the first terminal device enter the inactive state, the first network device can generate the configuration information. Alternatively, the configuration information is generated in advance, and when the first network device determines to make the first terminal device enter the inactive state, the first network device sends the configuration information to the first terminal device.

In addition, the configuration information indicates a dedicated resource for the first terminal device, that is, the configuration information only needs to be sent to the first terminal device. The implementation manner of transmitting the configuration information in the embodiments of the present disclosure will be described below with reference to the accompanying drawings.

Figure 3:
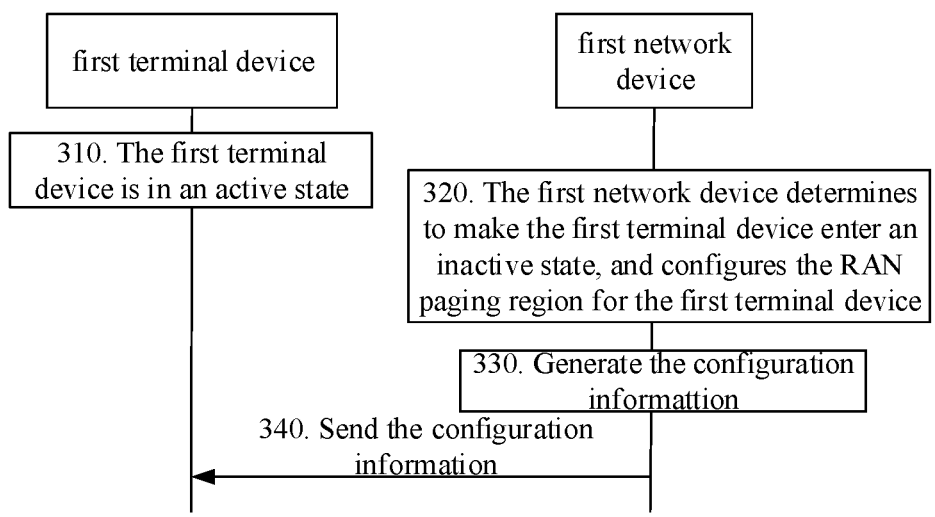
FIG. 3 is a schematic flowchart of a method for sending configuration information according to an embodiment of the present disclosure.

FIG. 3 is a schematic flowchart of a method 300 for transmitting the configuration information according to an embodiment of the present disclosure.

As shown in FIG. 3, the method 300 includes the following steps:

In 310, the first terminal device is in an active state.

In 320, the first network device determines to make the first terminal device enter an inactive state, and configures the RAN paging region for the first terminal device.

In 330, the first network device generates configuration information.

In 340, the first network device sends the configuration information to the first terminal device.

Sending the configuration information from the first network device to the first terminal device may include that the first network device sends Radio Resource Control (RRC) connection release signaling to the first terminal device. The RRC connection release signaling includes the configuration information.

According to exemplary embodiments, the first network device may further send Physical Downlink Control Channel (PDCCH) signaling to the first terminal device upon receipt the downlink data for the first terminal device that is sent by the core network. The PDCCH signaling includes the configuration information.

When the first terminal device moves in the RAN paging area, the first terminal device does not send reports to the network side. Therefore, the network side does not know which network device the cell where first terminal device is currently located corresponds to.

In order to solve the above problem, the embodiments of the present disclosure provide a method for transmitting PDCCH signaling. The first network device and the at least one second network device send the PDCCH signaling which includes the configuration information to the first terminal device.

According to exemplary embodiments, before sending the PDCCH signaling to the first terminal device, the first network device determines a first Cell Radio Network Temporary Identifier (C-RNTI) by negotiating with at least one second network device in a Radio Access Network (RAN) paging area. The RAN paging area is a paging area configured by the first network device for the terminal device. The PDCCH signaling is signaling scrambled by the first C-RNTI.

In the embodiments of the present disclosure, the at least one second network device may reserve the first C-RNTI for the first terminal device, or the first network device and the at least one second network device may allocate different C-RNTIs for the first terminal device.

According to exemplary embodiments, before the first network device sends the PDCCH signaling to the first terminal device, the first network device sends C-RNTI information to the first terminal device. If the at least one second network device reserves the first C-RNTI for the first terminal device, the C-RNTI information includes the first C-RNTI. If the first network device and the at least one second network device allocates different C-RNTIs to the first terminal device, the C-RNTI information includes the first C-RNTI, a Global Cell Identifier (CGI) corresponding to the first C-RNTI, at least one second C-RNTI, and a CGI corresponding to the at least one second C-RNTI. The at least one second C-RNTI is a C-RNTI which is allocated by a network device in the RAN paging area for the first terminal device. In this way, it can be ensured that the first terminal device can receive the configuration information in any cell in the RAN paging areas.

In other words, from the perspective of the first terminal device, after receiving the C-RNTI information sent by the first network device, the first terminal device may receive PDCCH signaling according to the C-RNTI information. For example, when the C-RNTI information includes only the first C-RNTI, the first terminal device may receive the PDCCH signaling sent by the first network device according to the first C-RNTI. The at least one second network device reserves the first C-RNTI for the first terminal device, and the first terminal device may receive PDCCH signaling sent from the at least one second network device according to the first C-RNTI. For example, when the C-RNTI information includes the first C-RNTI, the CGI corresponding to the first C-RNTI, the at least one second C-RNTI, and the CGI corresponding to the at least one second C-RNTI, the first terminal The device may receive the PDCCH signaling sent by the first network device according to the first C-RNTI and the CGI corresponding to the first C-RNTI. In other words, the first terminal device may determine a corresponding C-RNTI according to the CGI of the currently located cell, and receive the PDCCH signaling.

It can be seen from the above descriptions that the first terminal device in the embodiments of the present disclosure can receive the PDCCH signaling sent by the network device corresponding to any cell which the first terminal device is currently located by using the C-RNTI information, thereby ensuring that the first terminal device successfully receives the configuration information.

By way of example and not limitation, when the first network device acquires the C-RNTI information, a reservation request may be sent to each second network device. The reservation request is configured to request each of the at least one second network device to reserve the first C-RNTI for the first terminal device. Alternatively, a negotiation request is sent to each second network device. The negotiation request is configured to request each of the at least one second network device to allocate the second C-RNTI for the first terminal device. The first network device may receive a response message from each of the at least one second network device, and the response message is used by the first network device to determine the C-RNTI information.

By way of example and not limitation, when the first network device receives the downlink data sent by the core network, the first network device may also send notification information to the at least one second network. The notification information is used to notify each second network device that the first network device has received the downlink data, and then each second network device is triggered to allocate a dedicated random access resource for the first terminal device, and notifies the first terminal device of the allocated resource.

Figure 4:
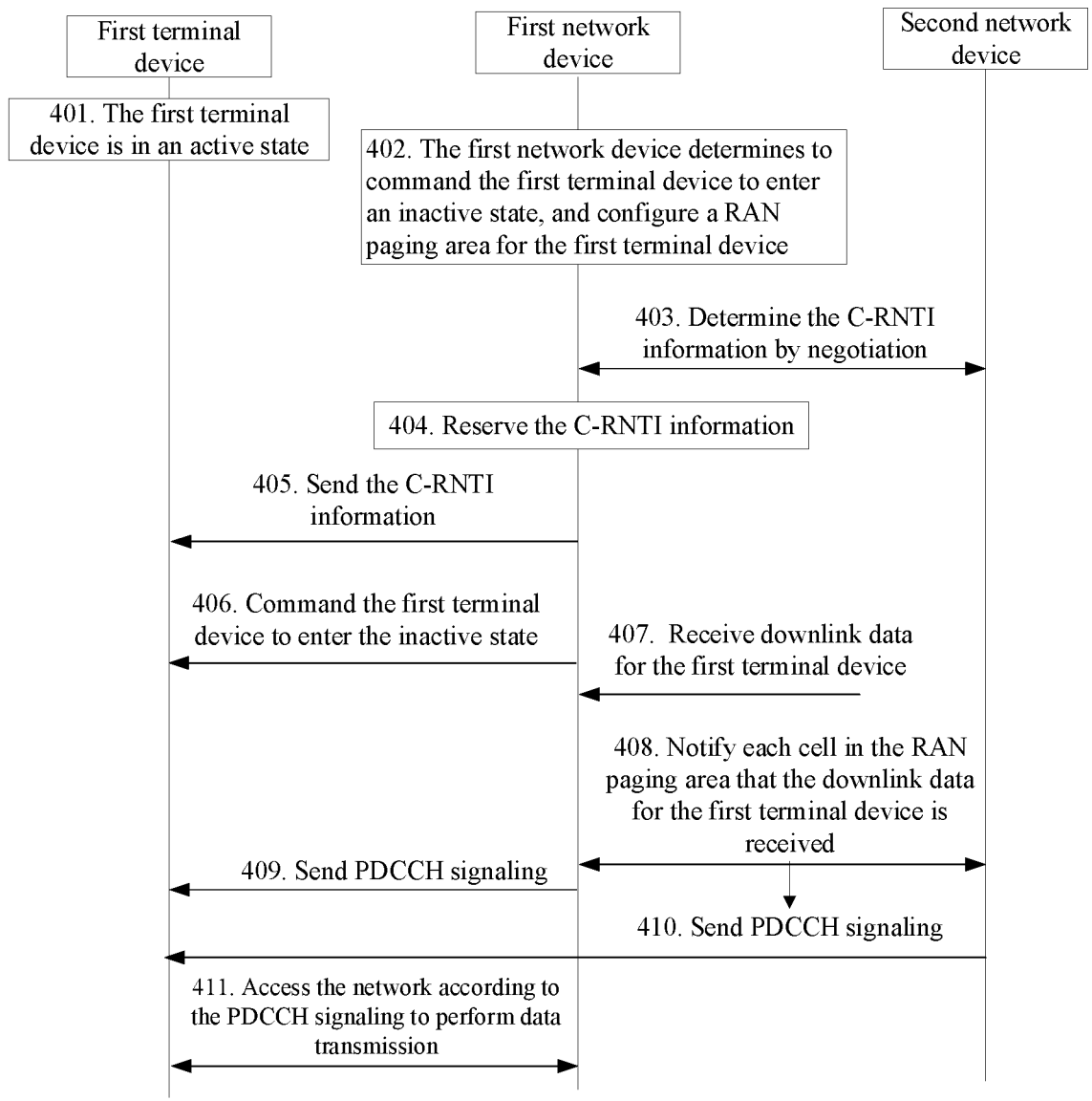
FIG. 4 is another schematic flowchart of a method for sending configuration information according to an embodiment of the present disclosure.

FIG. 4 is a schematic flowchart of another data transmission method 400 according to an embodiment of the present disclosure.

As shown in FIG. 4, the method 400 includes the following steps:

In 401, the first terminal device is in an active state.

In 402, the first network device determines to command the first terminal device to enter an inactive state, and configure a RAN paging area for the first terminal device.

In 403, the first network device and a second network device determine C-RNTI information by negotiation.

In 404, the first network device reserves the C-RNTI information.

In 405, the first network device sends the C-RNTI information to the first terminal device.

In 406, the first network device commands the first terminal device to enter the inactive state.

In 407, the first network device receives downlink data for the first terminal device.

In 408, the first network device notifies each cell in the RAN paging area that the downlink data for the first terminal device is received.

In 409, the first network device sends PDCCH signaling to the first terminal device.

In 410, the second network device sends PDCCH signaling to the first terminal device.

In 411, the first terminal device accesses the network according to the PDCCH signaling to perform data transmission.

In the embodiments of the present disclosure, when the first terminal device moves in the RAN paging area, the first terminal device does not send reports to the network side. Thus, the first network device and the at least one second network device may scramble the PDCCH signaling using respective C-RNTI, and send the PDCCH signaling to the first terminal device. The PDCCH signaling includes the configuration information.

It should be understood that the PDCCH signaling in the embodiments of the present disclosure may be signaling scrambled by C-RNTI. The PDCCH signaling can also be scrambled with a new identifier. For example, the PDCCH signaling can also be scrambled with other identification information of the first terminal device and embodiments of the present disclosure do not impose specific limitations on this.

For example, the identification information may be the identifier of the context information of the first terminal device (UE AS Context ID).

For example, assuming that the length of the UE AS Context ID is n, a Cyclic Redundancy Check (CRC) of length n is defined, and the CRC checks the PDCCH scrambled by the UE AS Context ID. Before the first network device commands the first terminal device to enter the inactive state, the first network device allocates the UE AS Context ID to the first terminal device, and the first terminal device in the inactive state acquires the configuration information by detecting the PDCCH scrambled by the UE AS Context ID.

For example, when downlink data arrives at the first network device, the first network device notifies the other cell (the at least one second network device in the embodiments of the present disclosure) that there is downlink data for the first terminal device identified by the UE AS Context ID, and triggers other cells to send the PDCCH signaling which is scrambled by UE AS Context ID to allocate dedicated random access resources.

It should be understood that in the embodiments of the present disclosure, the first terminal device is notified of the configuration information by the system message, the RRC connection release signaling, or the PDCCH signaling, and however these are only examples, and embodiments of the present disclosure are not limited to these examples.

For example, the first network device may also send a paging message to the first terminal device, and the paging message includes the configuration information. That is, the first terminal device acquires the configuration information using the paging message.

Figure 5:
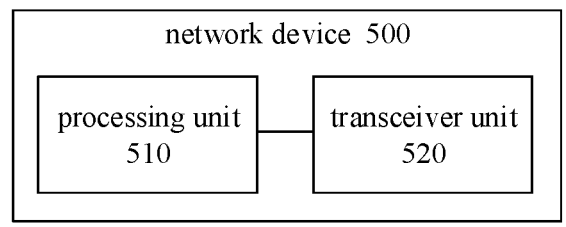
FIG. 5 is a schematic block diagram of a network device according to an embodiment of the present disclosure.

FIG. 5 is a schematic block diagram of a network device 500 according to an embodiment of the present disclosure.

As shown in FIG. 5, the network device includes a processing unit 510 and a transceiver unit 520.

The processing unit 510 is configured to generate configuration information. The configuration information is configured to indicate a resource used by a first terminal device in an inactive state to perform random access, and the inactive state refers to a state in which the first terminal device is disconnected from a first network device and the first network device keeps context information of the first terminal device.

The transceiver unit 520 is configured to send the configuration information to the first terminal device.

According to exemplary embodiments, the configuration information is configured to indicate a resource pool dedicated to the random access, the resource pool is used for at least one terminal device to perform the random access, and the at least one terminal device includes the first terminal device.

According to exemplary embodiments, an access level of each of the at least one terminal device is a specific access level, and/or a service type that each of the at least one terminal device uses for transmission is a specific service type.

According to exemplary embodiments, the transceiver unit 520 is configured to:
send a system message to the first terminal device, wherein the system message includes the configuration information.

According to exemplary embodiments, the configuration information is configured to indicate a dedicated resource used by the first terminal device to perform the random access.

According to exemplary embodiments, the processing unit 510 is configured to:
before the configuration information is generated, obtain an access level of the first terminal device and/or a service type used by the first terminal device for transmission; and
generate the configuration information if the access level of the first terminal device is a specific access level, and/or the service type used by the first terminal device for transmission is a specific service type.

According to exemplary embodiments, the processing unit 510 is configured to:
if it is determined to make the first terminal device enter the inactive state, generate the configuration information.

According to exemplary embodiments, the transceiver unit 520 is configured to:
send to the first terminal device Radio Resource Control (RRC) connection release signaling, wherein the RRC connection release signaling includes the configuration information.

According to exemplary embodiments, the transceiver unit 520 is configured to:
upon receipt of downlink data for the first terminal device sent from a core network, send Physical Downlink Control Channel (PDCCH) signaling to the first terminal device, wherein the PDCCH signaling includes the configuration information.

According to exemplary embodiments, the processing unit 510 is configured to:
before the Physical Downlink Control Channel (PDCCH) signaling is sent to the first terminal device, determine a first Cell Radio Network Temporary Identifier (C-RNTI) by negotiating with at least one second network device in a Radio Access Network (RAN) paging area, wherein the RAN paging area is a paging area configured by the first network device for the terminal device;
wherein the PDCCH signaling is signaling scrambled by the first C-RNTI.

According to exemplary embodiments, the at least one second network device reserves the first C-RNTI for the first terminal device, or the first network device and the at least one second network device allocates different C-RNTIs to the first terminal device.

According to exemplary embodiments, the transceiver unit 520 is further configured to:
before the Physical Downlink Control Channel (PDCCH) signaling is sent to the first terminal device, send C-RNTI information to the first terminal device;
wherein if the at least one second network device reserves the first C-RNTI for the first terminal device, the C-RNTI information includes the first C-RNTI; if the first network device and the at least one second network device allocates different C-RNTIs to the first terminal device, the C-RNTI information includes the first C-RNTI, a Global Cell Identifier (CGI) corresponding to the first C-RNTI, at least one second C-RNTI, and a CGI corresponding to the at least one second C-RNTI, wherein the at least one second C-RNTI is a C-RNTI which is allocated by a network device in the RAN paging area for the first terminal device.

According to exemplary embodiments, the transceiver unit 520 is further configured to:
before the C-RNTI information is sent to the first terminal device, send a reservation request to each of the at least one second network device, wherein the reservation request is configured to request each of the at least one second network device to reserve the first C-RNTI for the first terminal device; or, sending to each of the at least one second network device a negotiation request, wherein the negotiation request is configured to request each of the at least one second network device to allocate the second C-RNTI for the first terminal device; and
receive a response message from each of the at least one second network device, wherein the response message is used by the first network device to determine the C-RNTI information.

According to exemplary embodiments, the PDCCH signaling is signaling that is scrambled by identification information, and the identification information includes an identifier of the context information.

According to exemplary embodiments, the transceiver unit 520 is further configured to:
upon receipt of the downlink data sent by the core network, send to the at least one second network device notification information, wherein the notification information is configured to notify each of the at least one second network device that the first network device has received the downlink data.

According to exemplary embodiments, the transceiver unit 520 is further configured to:

send a paging message to the first terminal device, wherein the paging message includes the configuration information.

According to exemplary embodiments, the transceiver unit 520 is further configured to:

send to the first terminal device downlink data for the first terminal device; or receive uplink data for the first terminal device which is sent from the first terminal device.

Figure 6:
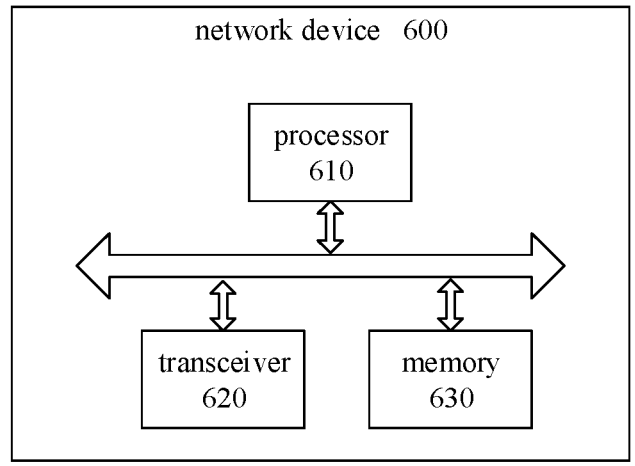
FIG. 6 is another schematic block diagram of a network device according to an embodiment of the present disclosure.

It should be noted that the processing unit 510 can be implemented by a processor, and the transceiver unit 520 can be implemented by a transceiver. As shown in FIG. 6, network device 600 can include a processor 610, a transceiver 620, and a memory 630. The memory 630 can be used to store instruction information, and can also be used to store codes, instructions, and the like executed by the processor 610. The various components in the network device 600 are connected by a bus system, and the bus system includes a power bus, a control bus, and a status signal bus in addition to a data bus.

The network device 600 shown in FIG. 6 can implement the various processes implemented by the network device in the foregoing method embodiments described with reference to FIG. 2 to FIG. 4, and details are not described herein again. That is, the method embodiments of the present disclosure may be applied to a processor or implemented by a processor.

Figure 7:
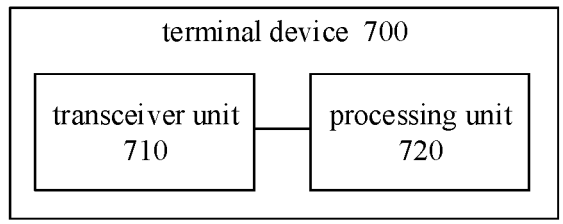
FIG. 7 is a schematic block diagram of a terminal device according to an embodiment of the present disclosure.

FIG. 7 is a schematic block diagram of a terminal device 700 according to an embodiment of the present disclosure.

As shown in FIG. 7, the terminal device includes a transceiver unit 710 and a processing unit 720.

The transceiver unit 710 is configured to receive configuration information sent from a first network device. The configuration information is configured to indicate a resource used by a first terminal device in an inactive state to perform random access, and the inactive state refers to a state in which the first terminal device is disconnected from the first network device and the first network device keeps context information of the first terminal device; and The processing unit 720 is configured to randomly access a network according to the configuration information.

According to exemplary embodiments, the configuration information is configured to indicate a resource pool dedicated to the random access, the resource pool is used for at least one terminal device to perform the random access, and the at least one terminal device includes the first terminal device;

the processing unit 720 is configured to:

according to the configuration information, randomly access the network in a resource contention manner.

According to exemplary embodiments, an access level of each of the at least one terminal device is a specific access level, and/or a service type that each of the at least one terminal device uses for transmission is a specific service type.

According to exemplary embodiments, the transceiver unit 710 is configured to:

receive a system message sent from the first network device, wherein the system message includes the configuration information.

According to exemplary embodiments, the configuration information is configured to indicate a dedicated resource used by the first terminal device to perform the random access;

the processing unit 720 is configured to:

according to the configuration information, randomly access the network using the dedicated resource.

According to exemplary embodiments, the transceiver unit 710 is further configured to:

before configuration information sent from the first network device is received, send to the first network device an access level of the first terminal device and/or a service type used by the first terminal device for transmission.

According to exemplary embodiments, the transceiver unit 710 is configured to:

receive Radio Resource Control (RRC) connection release signaling sent from the first network device, wherein the RRC connection release signaling includes the configuration information.

According to exemplary embodiments, the transceiver unit 710 is configured to:

receive Physical Downlink Control Channel (PDCCH) signaling sent from the first network device, wherein the PDCCH signaling includes the configuration information.

According to exemplary embodiments, the transceiver unit 710 is configured to:

before the Physical Downlink Control Channel (PDCCH) signaling sent from the first network device is received, receive Cell Radio Network Temporary Identifier (C-RNTI) information sent from the first network device, wherein the C-RNTI information includes a first C-RNTI; or the C-RNTI information includes the first C-RNTI, a Global Cell Identifier (CGI) corresponding to the first C-RNTI, at least one second C-RNTI, and a CGI corresponding to the at least one second C-RNTI, wherein the first C-RNTI is a C-RNTI which is allocated by the first network device for the first terminal device, and the at least one second C-RNTI is a C-RNTI which is allocated by a network device in a Radio Access Network (RAN) paging area for the first terminal device; and receive the PDCCH signaling sent from the first network device according to the first C-RNTI; or receive the PDCCH signaling sent from the first network device according to the first C-RNTI and the CGI corresponding to the first C-RNTI.

According to exemplary embodiments, the transceiver unit 710 is configured to:

receive the PDCCH signaling sent from the first network device according to identification information, wherein the identification information includes an identifier of the context information.

According to exemplary embodiments, the transceiver unit 710 is configured to:

receive a paging message sent from the first network device, wherein the paging message includes the configuration information.

According to exemplary embodiments, the transceiver unit 710 is further configured to:

send uplink data for the first terminal device to the first network device; or receiving downlink data for the first terminal device which is sent from the first network device.

Figure 8:
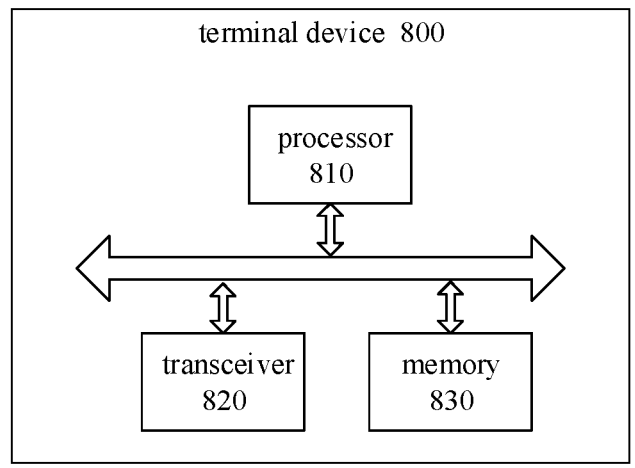
FIG. 8 is another schematic block diagram of a terminal device according to an embodiment of the present disclosure.

It should be noted that the transceiver unit 710 can be implemented by a transceiver, and the processing unit 720 can be implemented by a processor. As shown in FIG. 8, the terminal device 800 can include a processor 810, a transceiver 820, and a memory 830. The memory 830 can be used to store instruction information, and can also be used to store codes, instructions, and the like executed by the processor

810. The various components in the terminal device 800 are connected by a bus system, and the bus system includes a power bus, a control bus, and a status signal bus in addition to a data bus.

The terminal device 800 shown in FIG. 8 can implement the various processes implemented by the terminal device in the foregoing method embodiments described with reference to FIG. 2 to FIG. 4, and details are not repeatedly described herein. That is to say, the method embodiments of the present disclosure may be applied to a processor or implemented by a processor.

In implementations, each step of the method embodiments of the present disclosure may be completed by a hardware integrated logic circuit in a processor or instructions in a form of software. More specifically, the steps of the methods disclosed in the embodiments of the present disclosure may be directly implemented as a hardware decoding processor, or may be performed by a combination of hardware and software modules in the decoding processor. The software modules can be located in a conventional storage medium such as random access memory, flash memory, read only memory, programmable read only memory or electrically erasable programmable memory, registers, and the like. The storage medium is located in the memory, and the processor reads the information in the memory to complete the steps of the above methods in corporation with hardware.

The processors in the embodiments of the present disclosure may be an integrated circuit chip which has signal processing capability and can perform the methods, steps and logic block diagrams in embodiments of the present disclosure. Each of the above-described processors can be a general-purpose processor, a Digital Signal Processors (DSPs), an Application Specific Integrated Circuit (ASIC), a Field Programmable Gate Array (FPGA) or other programmable logic devices, transistor logic devices, discrete hardware components. The general-purpose processor can be a microprocessor or any conventional processor.

The memory in the embodiments of the present disclosure can be a volatile memory or a non-volatile memory, or can include both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, the memory in embodiments of the present disclosure may be, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

It should be understood that the terminologies in embodiments of the present disclosure and claims are used for describing exemplary embodiments, rather than limiting embodiments of the present disclosure.

For example, "a", "the", and "said" in a singular form used in embodiments of the present disclosure and claims are intended to include a plural form, unless otherwise defined.

For another example, the terms first terminal device and second terminal device may be used in the embodiments of the present disclosure, but these terminal devices should not be limited to these terms, and these terms are only used to distinguish different types of groups from one another.

For example, depending on the context, the words "in the case of . . . " as used herein may be interpreted as "if" or "under the condition that . . . " or "when" or "in response to determining . . . " or "in response to detecting . . . " and so on. Similarly, depending on the context, the phrase "if it is determined . . . " or "if (conditions or events stated) are detected" may be interpreted as "when it is determined . . . " or "in response to determination . . . " or "when (conditions or events stated) are detected" or "in response to detecting (conditions or events stated)".

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A data transmission method, comprising:
generating configuration information, wherein the configuration information is configured to indicate a resource used by a first terminal device in an inactive state to perform random access, and
the inactive state refers to a state in which the first terminal device is disconnected from a first network device and
the first network device keeps context information of the first terminal device;
sending the configuration information to the first terminal device;
wherein the configuration information is configured to indicate a dedicated resource used by the first terminal device to perform the random access; and
wherein before generating the configuration information, the method further comprises:
obtaining an access level of the first terminal device and/or a service type used by the first terminal device for transmission.

2. The method according to claim 1, wherein the configuration information is configured to indicate a resource pool dedicated to the random access, the resource pool is used for at least one terminal device to perform the random access, and the at least one terminal device comprises the first terminal device.

3. The method according to claim 2, wherein an access level of each of the at least one terminal device is a specific access level, and/or a service type that each of the at least one terminal device uses for transmission is a specific service type.

4. The method according to claim 1,
wherein generating configuration information comprises:
generating the configuration information if the access level of the first terminal device is a specific access level, and/or the service type used by the first terminal device for transmission is a specific service type.

5. The method according to claim 1, wherein sending the configuration information to the first terminal device, comprises:
sending to the first terminal device Radio Resource Control (RRC) connection release signaling, wherein the RRC connection release signaling comprises the configuration information.

6. The method according to claim 1, wherein sending the configuration information to the first terminal device comprises:
upon receipt of downlink data for the first terminal device sent from a core network, sending Physical Downlink Control Channel (PDCCH) signaling to the first terminal device, wherein the PDCCH signaling comprises the configuration information.

7. The method according to claim 6, wherein before sending the Physical Downlink Control Channel (PDCCH) signaling to the first terminal device, the method further comprises:
determining a first Cell Radio Network Temporary Identifier (C-RNTI) by negotiating with at least one second network device in a Radio Access Network (RAN) paging area, wherein the RAN paging area is a paging area configured by the first network device for the terminal device;
wherein the PDCCH signaling is signaling scrambled by the first C-RNTI.

8. The method according to claim 7, wherein the at least one second network device reserves the first C-RNTI for the first terminal device, or the first network device and the at least one second network device allocates different C-RNTIs to the first terminal device.

9. The method according to claim 8, wherein before sending the Physical Downlink Control Channel (PDCCH) signaling to the first terminal device, the method further comprises:
sending C-RNTI information to the first terminal device;
wherein if the at least one second network device reserves the first C-RNTI for the first terminal device, the C-RNTI information comprises the first C-RNTI; if the first network device and the at least one second network device allocates different C-RNTIs to the first terminal device, the C-RNTI information comprises the first C-RNTI, a Global Cell Identifier (CGI) corresponding to the first C-RNTI, at least one second C-RNTI, and a CGI corresponding to the at least one second C-RNTI, wherein the at least one second C-RNTI is a C-RNTI which is allocated by a network device in the RAN paging area for the first terminal device.

10. The method according to claim 9, wherein before sending the C-RNTI information to the first terminal device, the method further comprises:
sending a reservation request to each of the at least one second network device, wherein the reservation request is configured to request each of the at least one second network device to reserve the first C-RNTI for the first terminal device; or, sending to each of the at least one second network device a negotiation request, wherein the negotiation request is configured to request each of the at least one second network device to allocate the second C-RNTI for the first terminal device; and
receiving a response message from each of the at least one second network device, wherein the response message is used by the first network device to determine the C-RNTI information.

11. The method according to claim 6, wherein the PDCCH signaling is signaling that is scrambled by identification information, and the identification information comprises an identifier of the context information.

12. The method according to claim 1, wherein sending the configuration information to the first terminal device comprises:
sending a paging message to the first terminal device, wherein the paging message comprises the configuration information.

13. A network device, comprising:
a processor;
a memory storing instructions executable by the processor; and
a transceiver;
wherein the processor is configured to generate configuration information, wherein the configuration information is configured to indicate a resource used by a first terminal device in an inactive state to perform random access, and the inactive state refers to a state in which the first terminal device is disconnected from a first network device and the first network device keeps context information of the first terminal device;

wherein the transceiver is configured to send the configuration information to the first terminal device;

wherein the configuration information is configured to indicate a dedicated resource used by the first terminal device to perform the random access; and wherein the processor is configured to, before the configuration information is generated, obtain an access level of the first terminal device and/or a service type used by the first terminal device for transmission.

14. The network device according to claim 13, wherein the configuration information is configured to indicate a resource pool dedicated to the random access, the resource pool is used for at least one terminal device to perform the random access, and the at least one terminal device comprises the first terminal device.

15. The network device according to claim 13, wherein the processor is configured to generate the configuration information if the access level of the first terminal device is a specific access level, and/or the service type used by the first terminal device for transmission is a specific service type.

16. The network device according to claim 13, wherein the transceiver is configured to:

send to the first terminal device Radio Resource Control (RRC) connection release signaling, wherein the RRC connection release signaling comprises the configuration information.

17. The network device according to claim 13, wherein the transceiver is configured to:

upon receipt of downlink data for the first terminal device sent from a core network, send Physical Downlink Control Channel (PDCCH) signaling to the first terminal device, wherein the PDCCH signaling comprises the configuration information.

18. A terminal device, comprising:

a processor;

a memory storing instructions executable by the processor; and a transceiver;

wherein the transceiver is configured to receive configuration information sent from a first network device, wherein the configuration information is configured to indicate a resource used by the terminal device in an inactive state to perform random access, and the inactive state refers to a state in which the terminal device is disconnected from the first network device and the first network device keeps context information of the terminal device;

wherein the processor is configured to randomly access a network according to the configuration information;

wherein the configuration information is configured to indicate a dedicated resource used by the terminal device to perform the random access; and wherein the processor is configured to, before the configuration information is received, send an access level of the terminal device and/or a service type used by the terminal device for transmission.

* * * * *